United States Patent [19]
Pan et al.

[11] Patent Number: 6,109,574
[45] Date of Patent: *Aug. 29, 2000

[54] GAS LASER CHAMBER/OPTICS SUPPORT STRUCTURE

[75] Inventors: Xiaojiang J. Pan, San Diego; James K. Howey, Vista; Curtiss L. Mixon, Encinitas, all of Calif.

[73] Assignee: Cymer, Inc., San Diego, Calif.

[*] Notice: This patent is subject to a terminal disclaimer.

[21] Appl. No.: 09/174,155

[22] Filed: Oct. 16, 1998

Related U.S. Application Data

[63] Continuation-in-part of application No. 08/583,380, Jan. 5, 1996, Pat. No. 5,863,017.

[51] Int. Cl.$^7$ .................................................. F16M 11/00
[52] U.S. Cl. ........................ 248/176.1; 248/676; 248/678
[58] Field of Search ............................... 248/176.1, 139, 248/146, 550, 179.1, 180.1, 278.1, 678, 638, 676; 372/107, 108, 109

[56] References Cited

U.S. PATENT DOCUMENTS

| | | | |
|---|---|---|---|
| 4,534,047 | 8/1985 | Deschenaux et al. | 378/35 |
| 4,719,641 | 1/1988 | Muller et al. | 372/109 |
| 4,760,583 | 7/1988 | Sasnett et al. | 372/109 |
| 5,040,953 | 8/1991 | Tinsler | 417/363 |

FOREIGN PATENT DOCUMENTS

| | | |
|---|---|---|
| 0 288 265 | 10/1988 | European Pat. Off. . |
| 39 17 408 | 12/1989 | Germany . |
| 43 13 675 C | 5/1994 | Germany . |

OTHER PUBLICATIONS

Von H. de Boer, et al., "Ein schwingungsisolierterMeBtisch mit Niveau–Regelung",FEINWERKTECHNIK& MESSTECHNIK, vol. 88, No. 5 (Aug. 1980), pp. 233–236.

*Primary Examiner*—Ramon O. Ramirez
*Attorney, Agent, or Firm*—John R. Ross, Esq.

[57] ABSTRACT

A chamber/optics support structure for a laser having a laser chamber with a vibration source. The chamber and the laser resonance cavity optical elements are supported on a platform. The chamber is supported by a plurality of wheels which in turn rests on two tracks on track supports mounted on the platform. A flexible clamp flexibly clamps the chamber in a horizontal position to align it with the resonance cavity optical elements and to substantially decouple vibration between the chamber vibration source to the optical elements in a frequency range of concern.

The invention is especially useful for positioning the heavy laser chamber of a narrow band excimer laser and for decoupling vibrations resulting from its blower from the lasers line narrowing module and output coupler. In a preferred embodiment the plurality of wheels is three wheels, two of which rest in a V-groove track and one of which rests on a flat track. This preferred embodiment uses two flex-clamps each having an adjustment bolt and four symmetrically spaced silicon rubber vibration isolators. Precise horizontal alignment of the chamber is accomplished using the adjustment bolt which is then held in position with a lock nut and a clamping bolt. Silicon rubber dampers in the isolators decouple horizontal chamber vibrations from the optical elements.

6 Claims, 11 Drawing Sheets

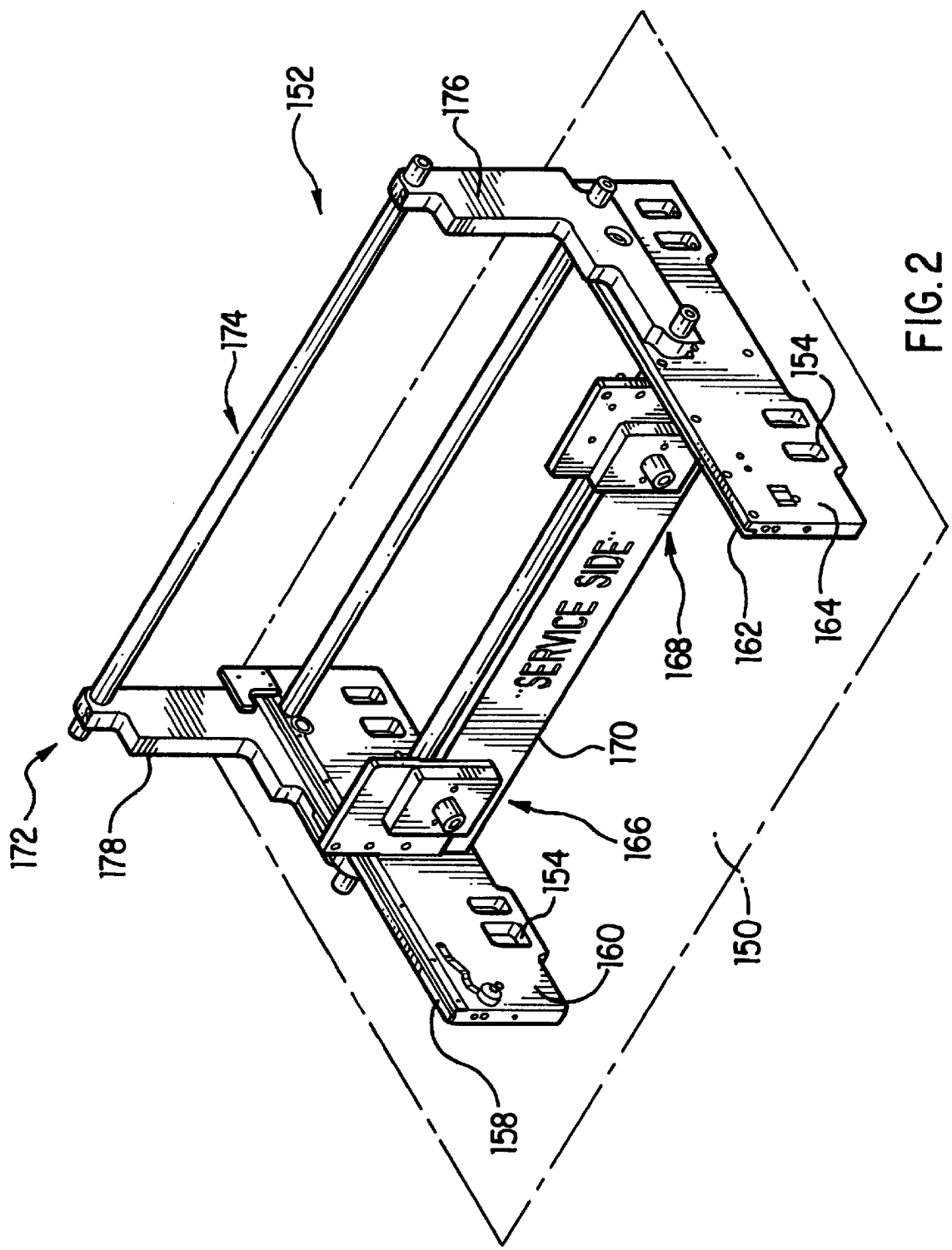

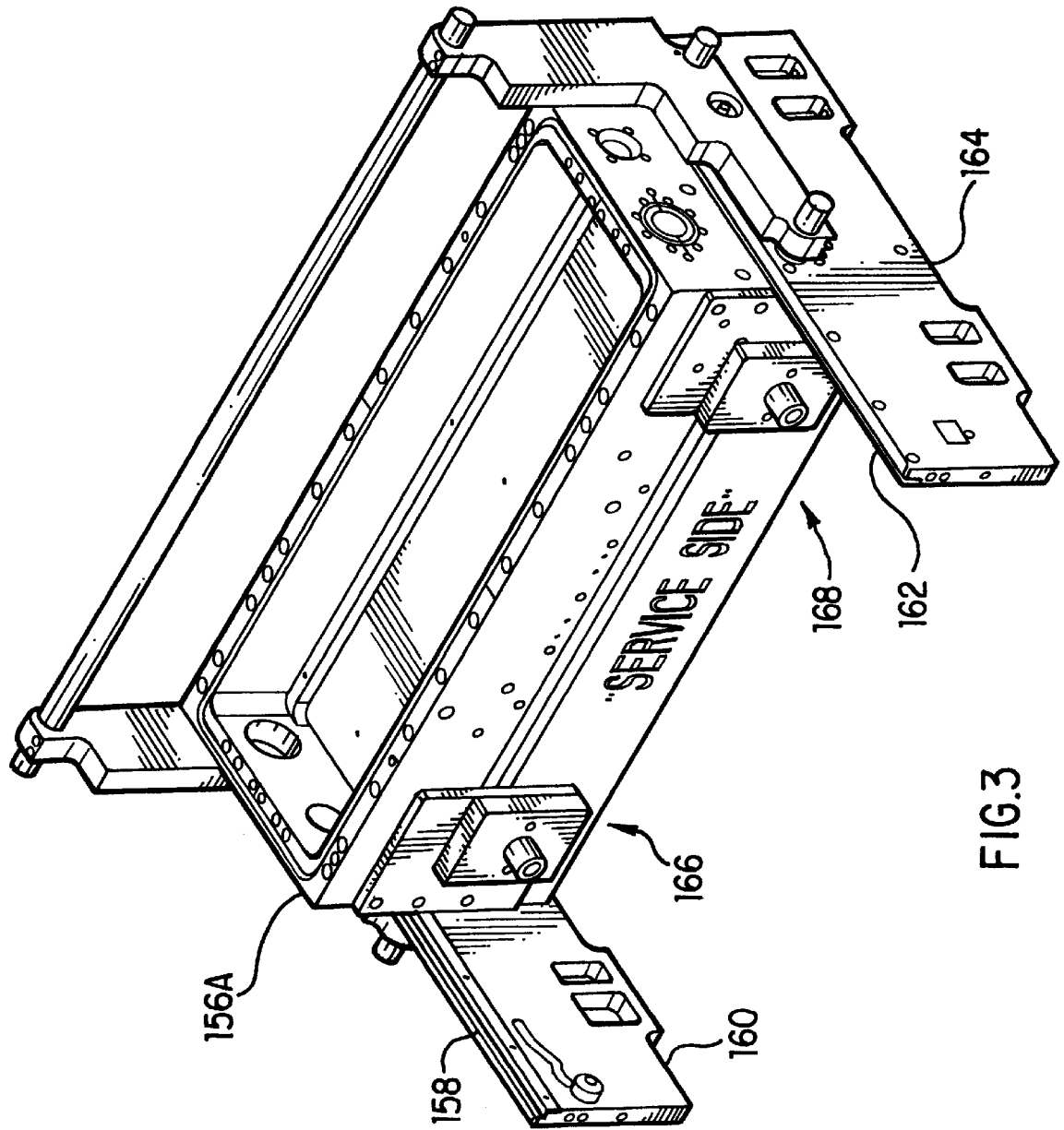

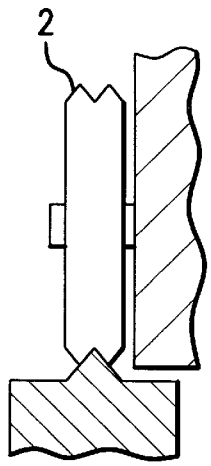
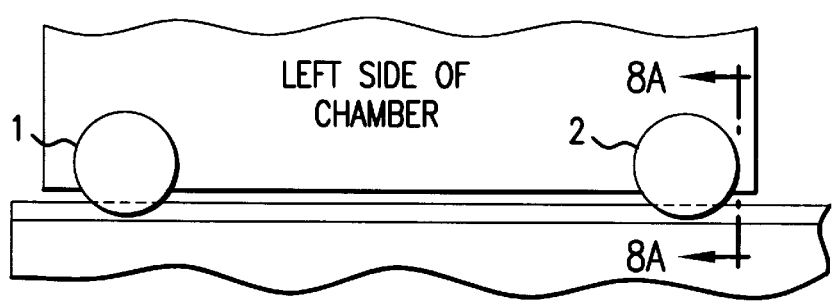
FIG. 8
FIG. 8A
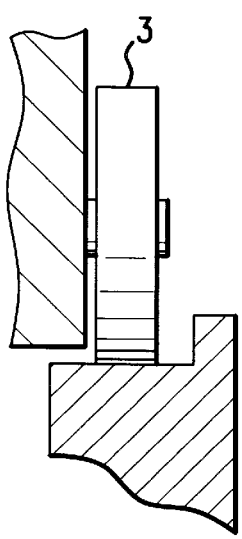
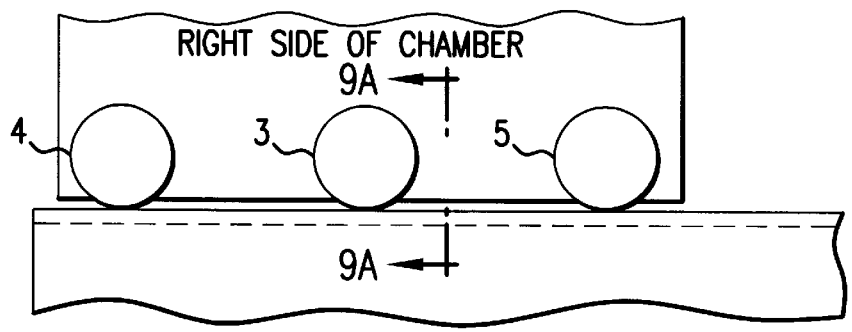
FIG. 9
FIG. 9A ously available damper.

GAS LASER CHAMBER/OPTICS SUPPORT STRUCTURE

This invention relates to gas lasers and in particular to support structures for such lasers. This invention is a continuation-in-part of application Ser. No. 08/583,380, filed Jan. 5, 1996, now U.S. Pat. No. 5,863,017.

BACKGROUND OF THE INVENTION

In many gas lasers including many excimer lasers, a gain medium is produced in a laser chamber by a discharge through a gas between two electrodes. For high repetition rates it is normally necessary to circulate the gas so that fresh gas is available between the electrodes at the beginning of each pulse. Often this circulation is provided by a blower with a tangential blower blade structure located inside the laser chamber which is driven by an electric motor and supported by bearings.

For many laser applications laser beam parameters must be controlled to very tight tolerances in terms of pulse energy, beam cross sectional dimensions, wavelength and bandwidth. Vibration, especially at resonant frequencies produced by the blower, can affect laser optical components and degrade laser beam quality.

What is needed is a laser support structure to minimize the effects of vibration from both external and internal sources.

SUMMARY OF THE INVENTION

The present invention provides a chamber/optics support structure for a laser having a laser chamber with a vibration source. The chamber and the laser resonance cavity optical elements are supported on a platform. The chamber is supported by a plurality of wheels which in turn rests on two tracks on track supports mounted on the platform. A flexible clamp flexibly clamps the chamber in a horizontal position to align it with the resonance cavity optical elements and to substantially decouple vibration between the chamber vibration source to the optical elements in a frequency range of concern.

The invention is especially useful for positioning the heavy laser chamber of a narrow band excimer laser and for decoupling vibrations resulting from its blower from the lasers line narrowing module and output coupler. In a preferred embodiment the plurality of wheels is three wheels, two of which rest in a V-groove track and one of which rests on a flat track. This preferred embodiment uses two flexible clamps each having an adjustment bolt and four symmetrically spaced silicon rubber vibration isolators. Precise horizontal alignment of the chamber is accomplished using the adjustment bolt which is then held in position with a lock nut and a clamping bolt. Silicon rubber dampers in the isolators decouple horizontal chamber vibrations from the optical elements.

BRIEF DESCRIPTION OF THE DRAWINGS

FIG. 2 is a drawing of a chamber/optics platform.

FIG. 3 shows a chamber bottom mounted in the FIG. 2 platform.

FIG. 8 is a drawing showing the left side of a chamber in a preferred embodiment and two wheels on the left side.

FIG. 8A is a drawing showing a front view of one of the wheels shown in FIG. 8.

FIG. 9 is a drawing showing the right side of the chamber referred to in the description of FIG. 8 and showing three wheels.

FIG. 9A is a drawing showing a front view of one of the three wheels on the right side.

DETAILED DESCRIPTION OF PREFERRED EMBODIMENTS

Laser Support Frame

Figure 1:
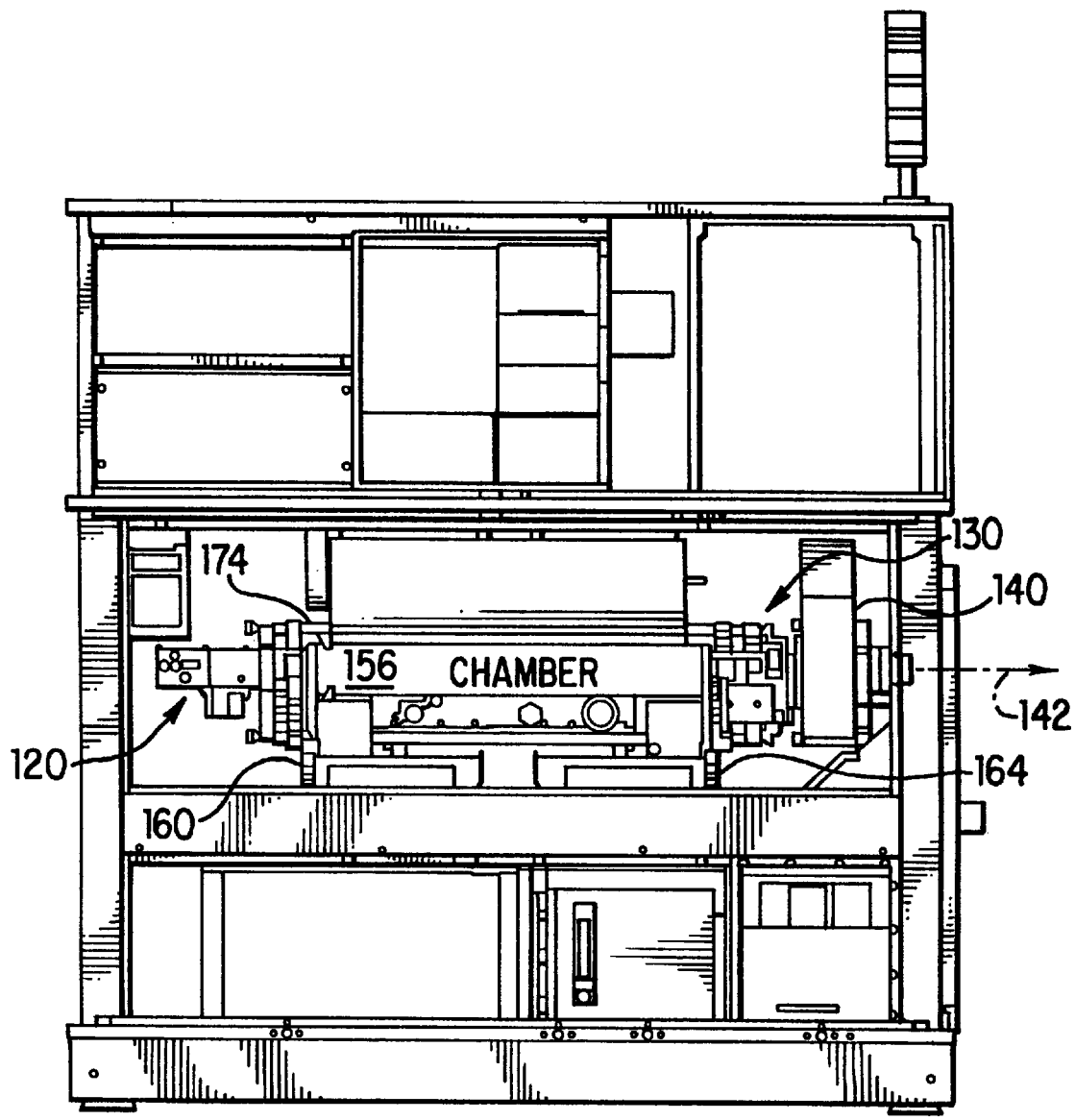
FIG. 1 is a drawing showing features of a state-of-the-art excimer laser.
Figure 1A:
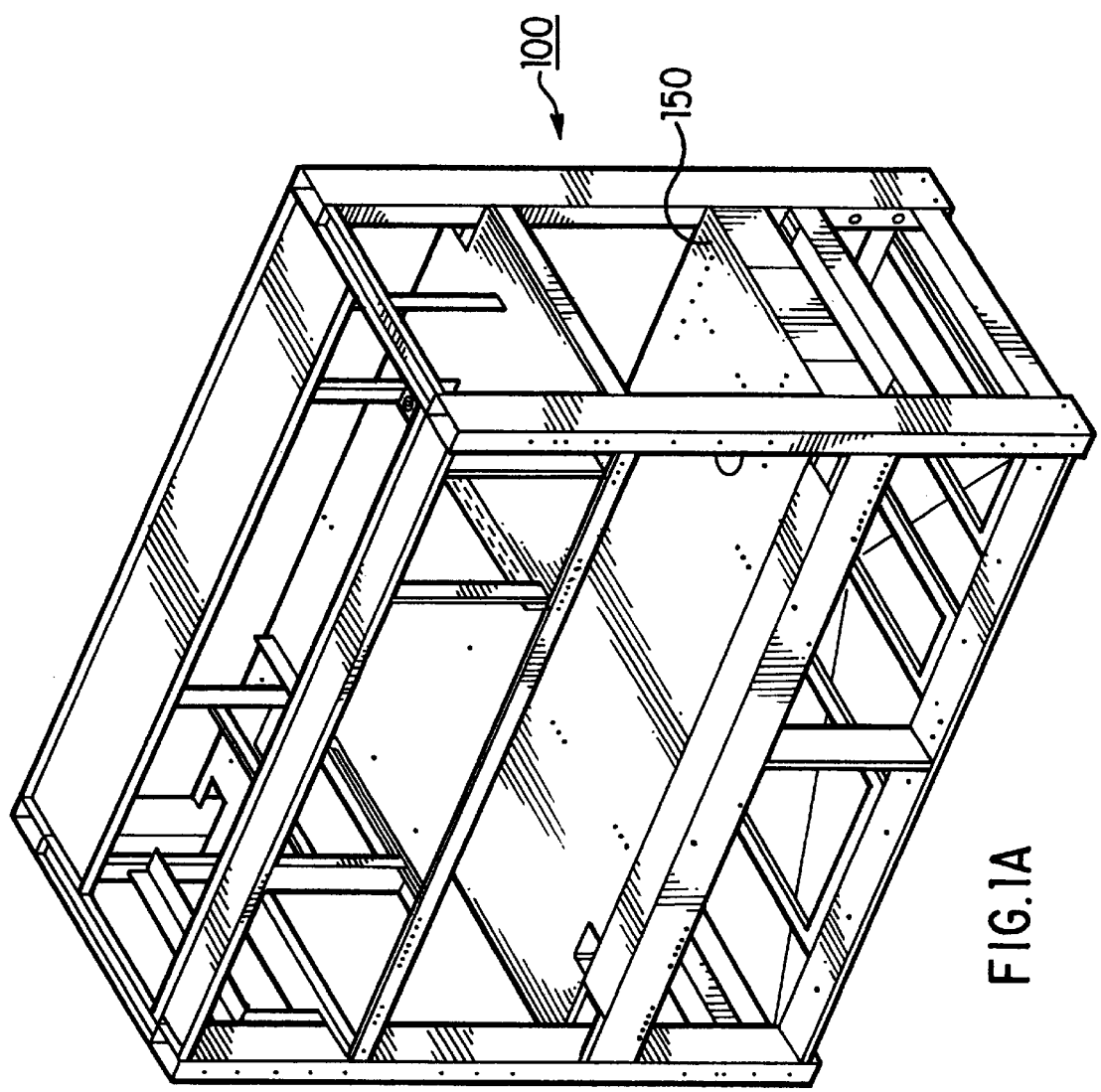
FIG. 1A is a drawing of a laser support frame.

FIG. 1 is a drawing showing the general location of the chamber and some of the optical equipment of a state of the art narrow band excimer laser used as a light source for integrated circuit lithography. The drawing shows laser chamber 156, line narrowing module 120, output coupler module 130 and wavemeter 140 and indicates the direction of output beam 142. This equipment plus numerous other equipment including electrical and gas support equipment needed for the operation of the laser are mounted on a laser support frame. A detailed description of a laser support frame for an excimer laser is described in U.S. Pat. No. 5,863,017 assigned to the assignee of the present application. This application is incorporated herein by reference. FIG. 5A of that application is substantially reproduced in this application as FIG. 1A. Laser support frame 100 includes chamber/optics platform 150 which is mounted within frame 100 on at three attachment points each of which points is a swivel joint comprising a ball-cup joint as described in U.S. Pat. No. 5,863,017. The purpose of this special mounting is to prevent any distortion of chamber/optics platform 150 as a result of forces applied to laser support frame 100.

FIG. 2 shows a chamber-optics support frame 152 which in this preferred embodiment is bolted onto chamber/optics platform 150 with eight bolts at locations 154. In this preferred embodiment support frame 152 supports a laser chamber on platform 150 and also supports the associated resonance cavity optics also on platform 150, and permits alignment of the laser optics with the laser chamber. However, the frame is designed to avoid or minimize distortions in the optical equipment resulting from thermal and vibrational purturbations in the chamber. This is accomplished as follows:

Chamber Rolls on Tracks on Cross Ribs

The bottom portion 156A of chamber 156 as shown in FIG. 3 is supported vertically by two cross ribs 160 and 164. The bottom of chamber 156 is equipped with three metal wheels (not shown 1, 2, 3) two of which (1 and 2) roll in V-track 158 in cross rib 160 as shown in FIGS. 8 and 8A and one of which, (1) (4 and 5) rolls on flat track 162 on cross rib 164 as shown in FIGS. 9 and 9A during installation of the chamber and during operation these wheels provide vertical support for the chamber. (In this embodiment two additional wheels (4 and 5) are provided on the flat track side of the chamber to aid in chamber installation and removal, but these wheels are elevated as shown in FIG. 9 so that they do not furnish any support during laser operation.) The chamber is supported and aligned horizontally by flexible clamps 166 and 168 which attach to chamber bottom 156A and frame element 170 as shown in FIG. 3. The reader should note that the three roller vertical support permits unrestrained three dimensional thermal expansion and contraction of chamber 156. Flexible clamps 166 and 168 are described in detail below but for now the reader should note that these clamps are used to horizontally align the chamber with the chamber optics and to hold chamber 156 in close alignment with these optical components while at the same time decoupling blower caused high frequency chamber vibrations from the optical components.

Optics Support

Optics support structure 172, as shown in FIG. 2, consists primarily of output coupler support frame 176, line narrowing module support frame 178 and three cross bars 174 comprised of a iron-nickel alloy sold under the designation INVAR-36 by High Temp Metals, Inc. with offices in Sylmar, Calif. This material is designed to provide a minimal (almost zero) coefficient of thermal expansion in the temperature range of interest. The three bars are rigidly attached to output coupler support frame 176 and to line narrowing module support frame 178 but the bars are not directly attached to cross braces 160 or 164 but pass through holes in these cross braces. Optics support structure 172 is kinematically mounted on platform 150. Frames 176 and 178 are attached to cross braces 164 and 160 respectively with bearings so as to avoid any distortion of the optics support structure. Frame 176 is attached to cross brace 162 with a single radial bearing which permits rotation of frame 176 radially but restricts axial (i.e., in the direction of rods 174) motion, cross (i.e. in the direction of cross brace 164) motion and vertical motion of support structure 172. Frame 178 is attached to cross brace 160 in two places, first with an axial bearing which permits movement in the axial direction and second with a slot mounted axial bearing which permits axial motion and motion in the cross direction.

Flexible Clamps

Figure 4A:
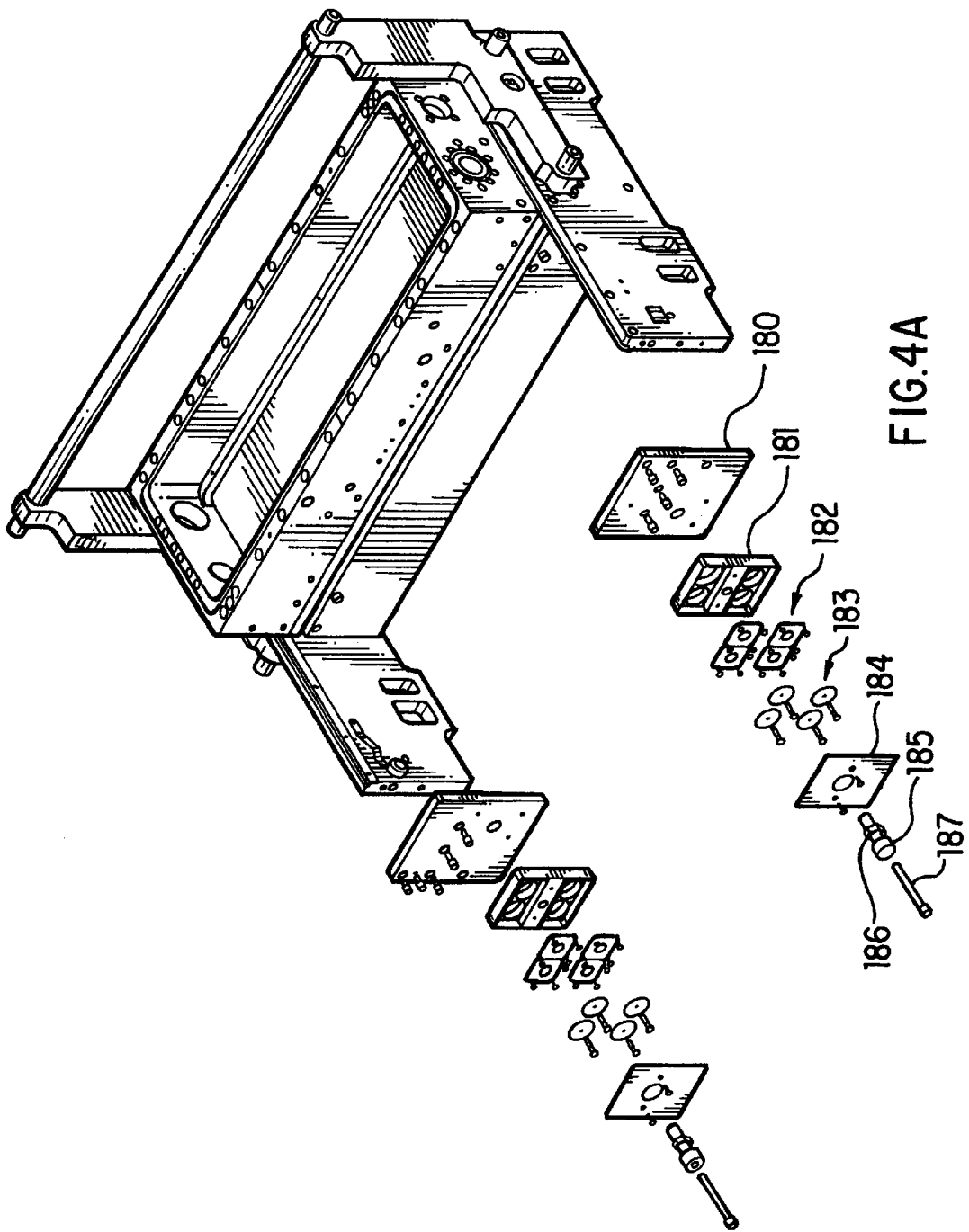
FIG. 4A is a drawing showing exploded views of two flexible clamps.

As stated above, flexible clamps 166 and 168 are used to align and to flexibly clamp chamber 156 horizontally in chamber optics support frame 152. The chamber bottom 156A is shown in FIG. 3 clamped into position with flexible clamps 160 and 168. An exploded assembly drawing of flexible clamp 166 is shown in FIG. 4A. It is comprised of interface plate 180, mounting plate 181, four silicon rubber Series AM 004 vibration isolators 182 available from Lord Corporation, Erie, Pa., four travel limiting washers 183, an isolator cover 184, an adjustment knob 185, an adjustment lock nut 186 and a clamping bolt 187.

Figure 4D:
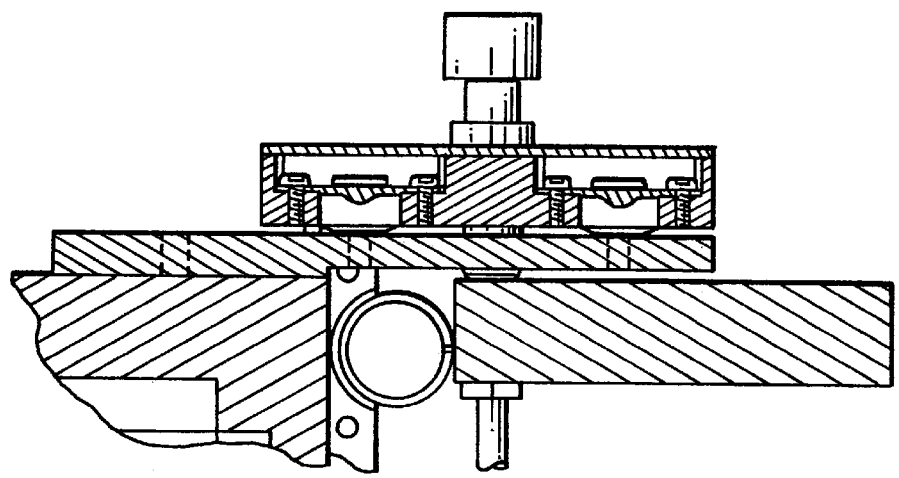
FIGS. 4B, 4C, and 4D are cross sectional drawings of a flexible clamp.
Figure 4C:
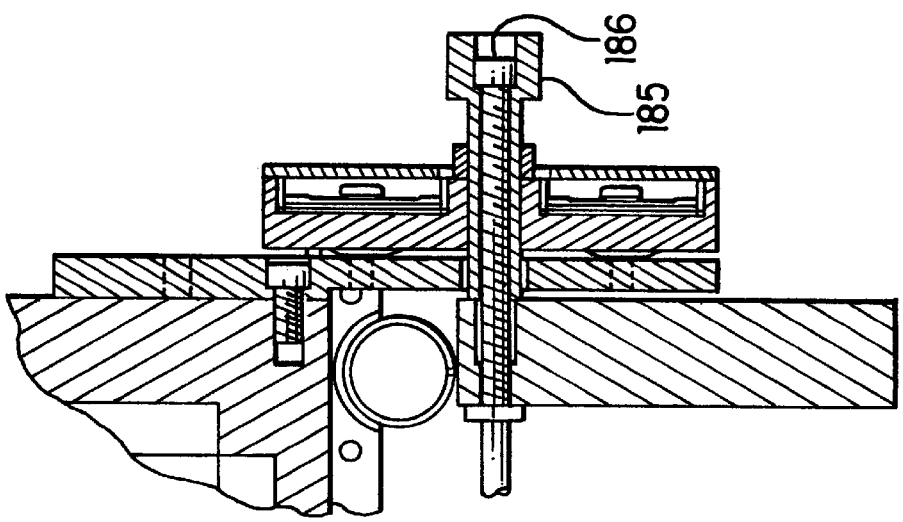
Figure 4B:
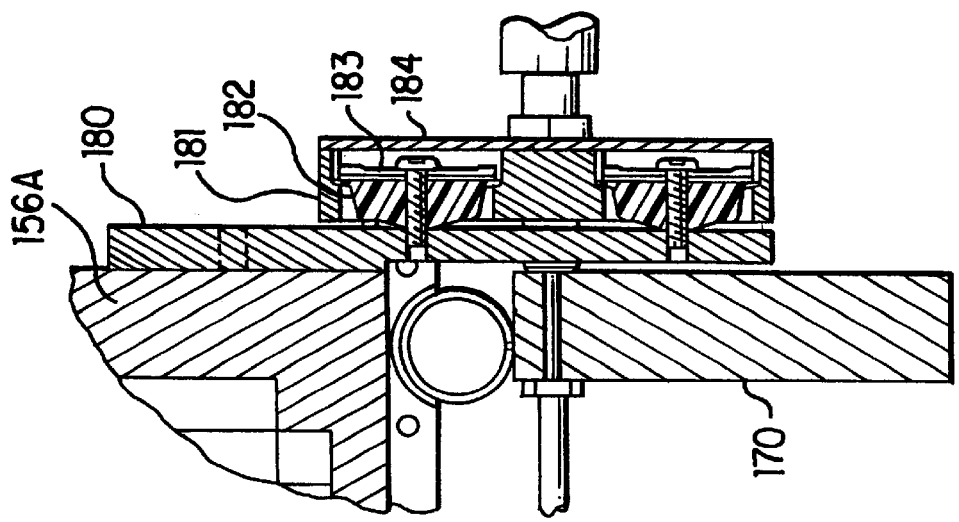

FIGS. 4B, 4C and 4D are cross sectional drawings of flexible clamps 168. Flexible clamp 166 is just like flexible clamp 168 except for the location of some of the bolt holes. FIG. 4B is a cross section through the center of silicon rubber vibration isolators 182. FIG. 4C is a cross section through the center of adjustment knob 185. FIG. 4D is a cross section through the center of two of the bolts holding down each of the vibration isolators.

Figure 4E:
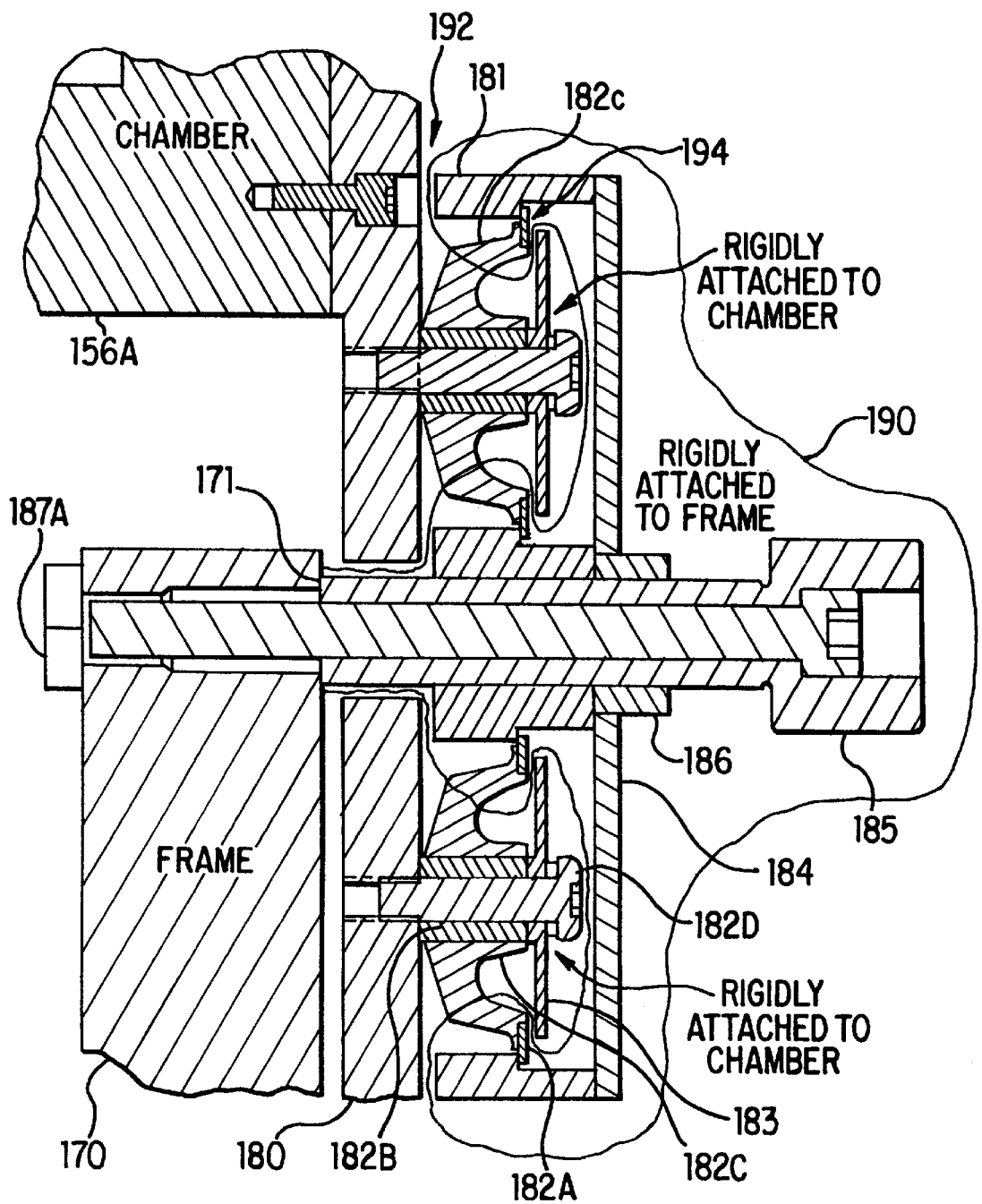
FIG. 4E shows a cross section of a flexible clamp in place.

FIG. 4E is disjointed cross section drawing through the center of isolators 182 and also through the center of adjustment knob 185. FIG. 4E demonstrates the functioning of the flexible clamps. As shown in FIG. 4E, isolator 182 is comprised of steel top plate 182A, steel isolator central cylinder 182B and silicon rubber damper 182C. Damper 182C is glued to cylinder 182B and top plate 182A and each top plate 182A is bolted to mounting plate 181 with four bolts shown in FIG. 4A but the bolts are not shown in FIG. 4E.

Cylinder 182B and travel limiting washer 183 are rigidly attached to interface plate 180 with hold down bolt 182D and a lock washer as shown in FIG. 4E. As shown in FIG. 4E interface plate 180 is rigidly attached to chamber bottom 156A. Adjustment bolt 185 threads through mounting plate 181 and rests solidly against frame 170 as shown at 171. Lock nut 186 holds bolt 185 in position. Clamping bolt 187 passes through the center of adjustment bolt 185 and screws into threaded receptor 187A to rigidly attach mounting plate 181 and other components within boundary line 190 (shown on FIG. 4E) to frame element 170.

Thus, with respect to potential rotary blower vibrations, the chamber is isolated in the cross horizontal direction by the eight silicon rubber dampers 182C in the two flexible clamps. Frame 100 is very stiff in the vertical direction so that the transfer of vertical vibrations from the this chamber through the frame elements to optical components is very small. The frame is much more susceptible to high frequency cross horizontal vibration but these are substantially isolated from the frame by the eight dampers 182C. There is also coupling in the longitudinal horizontal direction but in this direction, there is very little blower caused vibration because this is the direction of the blower axis.

Figure 5B:
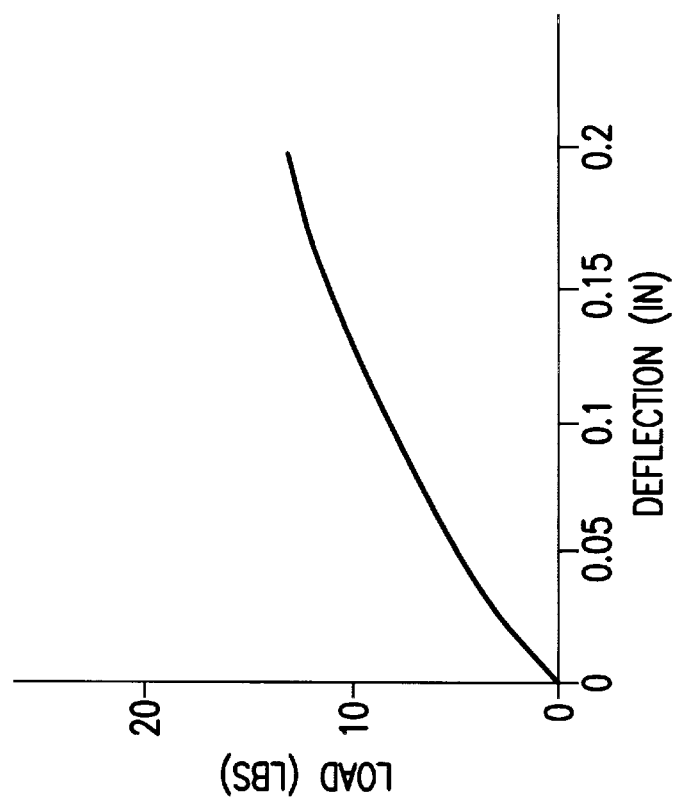
FIGS. 5A and 5B are graphs showing properties of a commercially available damper.
Figure 5A:
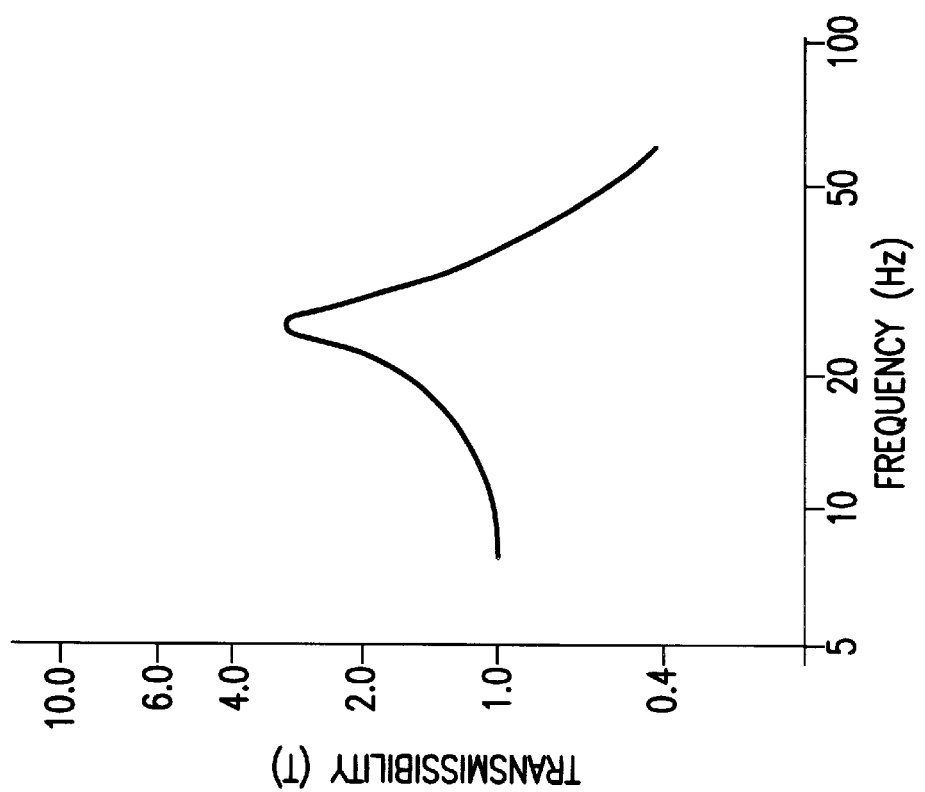
Figure 7:
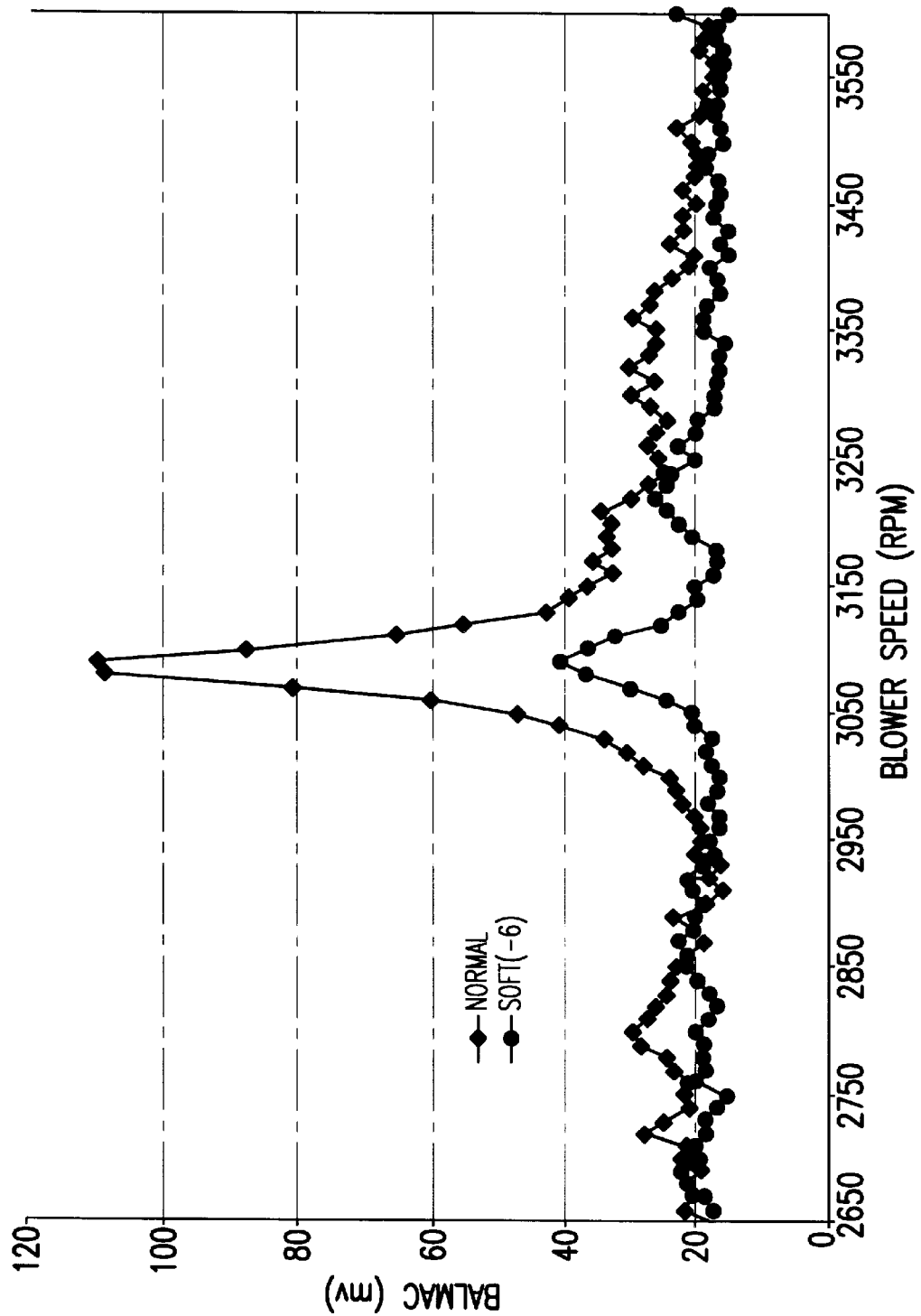
FIG. 7 is a chart displaying vibration coupling as a function of blower speed.

FIG. 5A shows the transmissibility of silicon rubber dampers 182C as a function of frequency and FIG. 5B shows the deflection of the dampers as a function of load. Since the chamber is on rollers and tracks 158 and 162 are level the net steady state load on dampers 182C is zero. FIG. 7 is a comparison of vibration data taken with a Balmac vibration monitor on an excimer laser having bearings which had been subjected to significant wear. The data represented by diamonds was acquired with the chamber mounted rigidly to frame element 170. The data represented by circles was acquired with the flexible clamps described above. With the rigid mounting, this particular laser displayed a substantial resonance with the blower operating at about 3070 rpm. The present invention greatly reduced the resonance coupling.

Figure 6A:
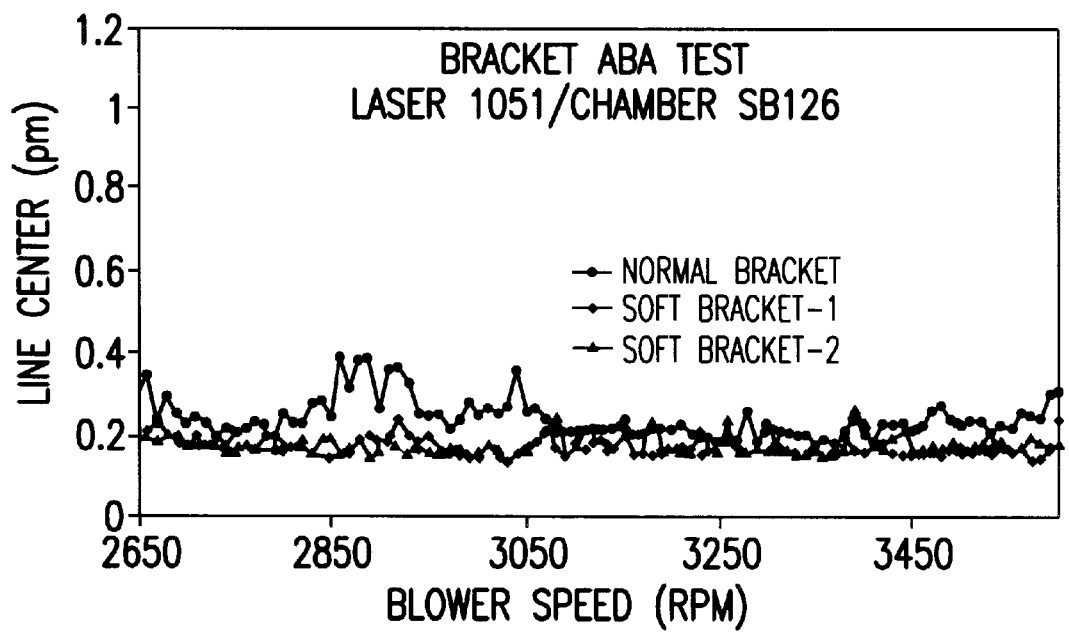
FIGS. 6A and 6B are charts showing the effect of resonance vibration on wavelength.
Figure 6B:
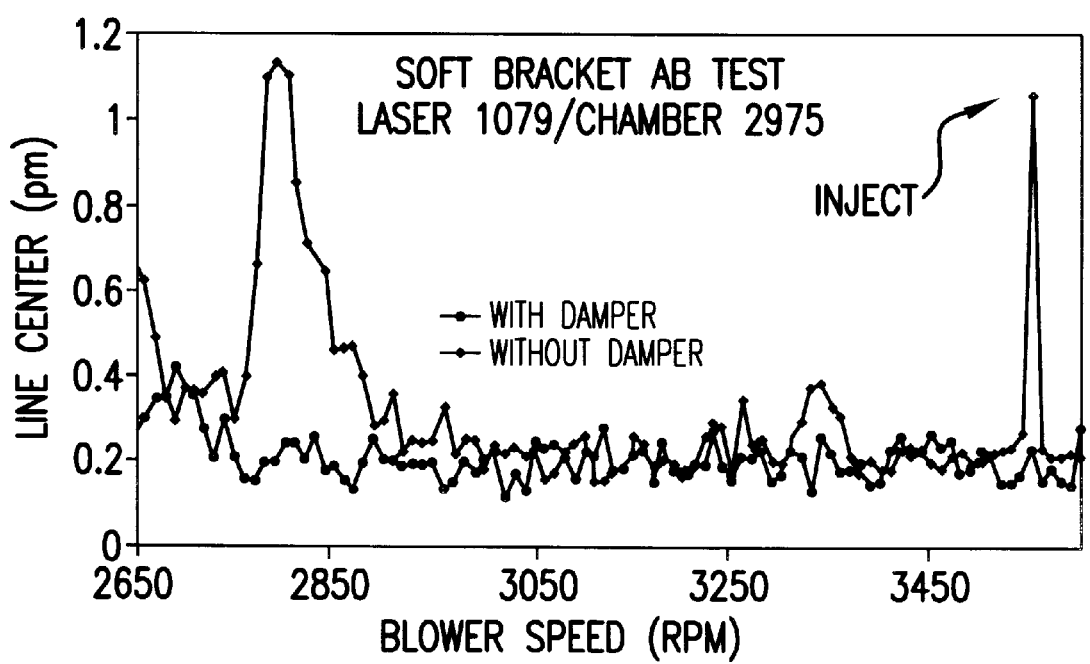

FIG. 6B shows plots of wavelength variations as a function of blower speed for a laser with worn bearings with the flexible clamp and with rigid clamps. (The bad data point at about 3350 results from a fluorine injection and is unrelated to vibrations.) FIG. 6A is a similar chart with newer bearings. Comparisons are shown for rigid clamps (circle), a simple clamp made with a rubber pad sandwich (triangles) and the above described flexible clamp.

Alignment

The flexible clamps described above are used to align the chamber horizontally as follows: Chamber 156 is rolled into approximate position on tracks 158 and 162. Interface plate 182 is bolted onto chamber bottom 156A. With cover 181 removed mounting plate 181 is bolted onto interface plate 182 using isolator bolts 182D. Cover 181 is installed and adjustment bolt is screwed into mounting plate until the tip of adjustment bolt 185 rests against frame element 170 as shown at 171. Adjustment bolt 185 is then adjusted to align chamber 156 with the laser optics in line narrowing module 120 and output coupler module 130. When the laser is aligned lock nut 186 is tightened and lock bolt 187 is screwed into threaded nut 187A in frame element 170 to hold laser chamber in place relative to frame element 170. The reader shall note that if chamber removal is required, the position of adjustment bolt 185 and lock nut 186 should not be changed so that when the chamber is reinstalled realignment would normally not be required.

Horizontal Deflections

High frequency horizontal vibration forces are mostly absorbed in dampers 182C as indicated in FIG. 5A. The design of flexible clamp 182 limits deflections to less than 0.2 inches. Deflection is limited to the spaces shown at 192 and 194. Deflections greater than distances of about 0.2 inches could damage dampers 182C.

Persons skilled in the art will recognize that many other embodiments of the present invention are possible based on the teachings expressed in the above disclosure.

Therefore, the reader should determine the scope of the present invention by the appended claims and their legal equivalents.

We claim:

1. A gas laser chamber/optics support structure for support of resonance cavity optical elements and a laser chamber, said structure comprising:
   A) a laser chamber defining a gain medium and a vibration source and having at least three wheels,
   B) a laser support frame,
   C) a chamber/optics platform mounted on said laser support frame,
   D) at least two resonance cavity optical elements mounted on said chamber/optics platform,
   E) a first track support defining a first track and a second track support defining a second track, said laser chamber being rollingly supported on said first and second tracks with said at least three wheels, and
   F) at least one flexible clamp for flexibly clamping said chamber in a desired horizontal position for alignment of said chamber with said resonance cavity optical elements and for reducing vibration coupling from said chamber vibration source to said resonance cavity optical elements.

2. A structure as in claim 1 wherein said at least three wheels is three wheels.

3. A structure as in claim 2 wherein said first track is a groove track, wherein two of said three wheels are supported on said groove track and said second track is a flat track wherein one wheel is supported on said flat track.

4. A structure as in claim 1 wherein said flexible clamp comprises a mounting plate and an adjustment bolt threaded through said mounting plate to an extent necessary to align said gain medium in said chamber with said resonance cavity optical elements.

5. A structure as in claim 4 wherein a portion of each of said at least one flexible clamp defines a first portion rigidly mounted to said chamber and a second portion rigidly mounted to said frame and wherein said flexible clamp comprises a plurality of dampers positioned to separate said first portion from said second portion.

6. A structure as in claim 4 wherein said at least one clamp is two clamps and said plurality of dampers is four dampers.

* * * * *

UNITED STATES PATENT AND TRADEMARK OFFICE
CERTIFICATE OF CORRECTION

PATENT NO. : 6,109,574
DATED : August 29, 2000
INVENTOR(S): Xiaojiang J. Pan, et al.

It is certified that error appears in the above-identified patent and that said Letters Patent are hereby corrected as shown below:

Column 2, line 63, delete "(not shown 1, 2, 3)" and insert -- 1, 2 and 3 --.

Column 2, line 64, delete "(1) (4 and 5)" and insert -- 3 --.

Signed and Sealed this

Twenty-fourth Day of April, 2001

*Attest:*

NICHOLAS P. GODICI

*Attesting Officer*    *Acting Director of the United States Patent and Trademark Office*

UNITED STATES PATENT AND TRADEMARK OFFICE
CERTIFICATE OF CORRECTION

PATENT NO.   : 6,109,574
DATED        : August 29, 2000
INVENTOR(S)  : Xiaojiang J. Pan, James K. Howey and Curtiss L. Mixon It is certified that error appears in the above-identified patent and that said Letters Patent is hereby corrected as shown below:

Delete Drawing Sheet 11 and substitute therefor the Drawing Sheets consisting of Fig. 9, as shown on the attached pages.

Signed and Sealed this

Eleventh Day of December, 2001

*Attest:*

*Nicholas P. Godici*

*Attesting Officer*

NICHOLAS P. GODICI
*Acting Director of the United States Patent and Trademark Office*

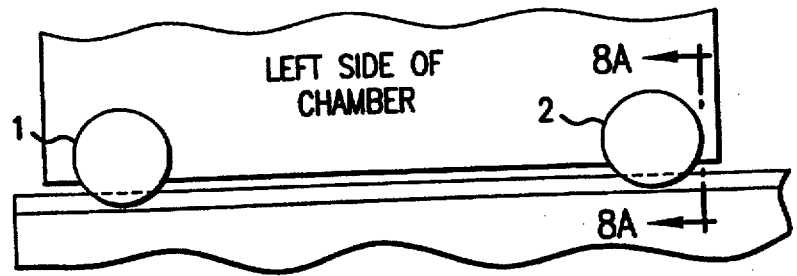
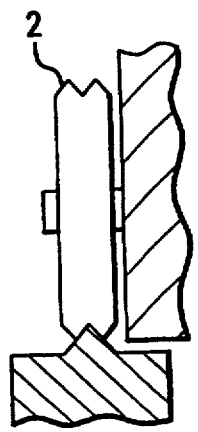
FIG. 8
FIG. 8A
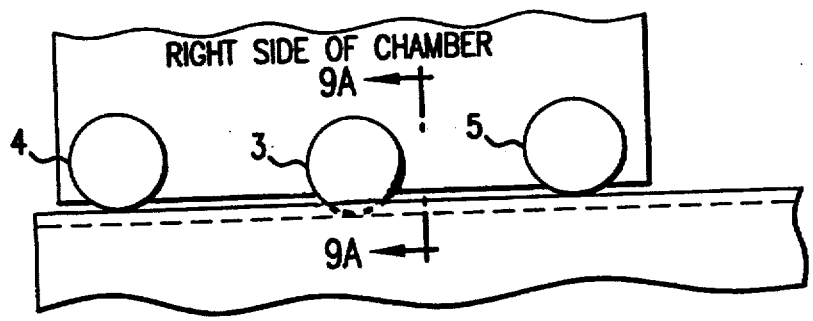
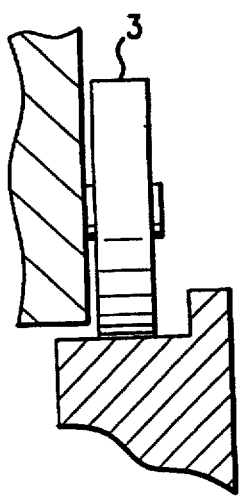
FIG. 9
FIG. 9A